(12) United States Patent
Hartal et al.

(10) Patent No.: US 7,883,731 B2
(45) Date of Patent: Feb. 8, 2011

(54) NATURAL COLORING PRODUCTS

(75) Inventors: Dov Hartal, Tel Aviv (IL); Yigal Raveh, Haifa (IL); Abraham Wolf, Kiryat Ata (IL)

(73) Assignee: Lycored Natural Products, Beer-Sheva (IL)

( * ) Notice: Subject to any disclaimer, the term of this patent is extended or adjusted under 35 U.S.C. 154(b) by 601 days.

(21) Appl. No.: 11/590,845

(22) Filed: Nov. 1, 2006

(65) Prior Publication Data

US 2007/0110857 A1     May 17, 2007

Related U.S. Application Data

(63) Continuation of application No. 09/449,093, filed on Nov. 24, 1999, now abandoned, which is a continuation-in-part of application No. 09/392,866, filed on Sep. 9, 1999, now abandoned, which is a continuation-in-part of application No. 08/507,632, filed on Jul. 25, 1995, now abandoned, which is a continuation-in-part of application No. 08/184,382, filed as application No. PCT/AU94/00401 on Jan. 21, 1994, now abandoned.

(30) Foreign Application Priority Data

Jan. 21, 1993   (IL)  ..................... 104473

(51) Int. Cl.
*C12C 5/04*     (2006.01)
(52) U.S. Cl. ................. 426/250; 426/478; 426/481; 426/540
(58) Field of Classification Search ............ 426/250, 426/270, 481, 540, 262
See application file for complete search history.

(56) References Cited

U.S. PATENT DOCUMENTS

| 3,833,350 | A | | 9/1974 | Cooke et al. |
| 3,864,504 | A | | 2/1975 | Szabo et al. |
| 4,181,743 | A | * | 1/1980 | Brumlick et al. ............ 426/241 |
| 4,557,799 | A | * | 12/1985 | Nelson et al. ................. 156/44 |
| 4,670,281 | A | | 6/1987 | Bradley |
| 4,726,955 | A | * | 2/1988 | Horn et al. .................... 426/73 |
| 5,035,909 | A | | 7/1991 | Lomelin et al. |
| 5,229,160 | A | * | 7/1993 | Lang ........................... 426/615 |
| 5,245,095 | A | * | 9/1993 | Graves et al. ............... 585/351 |
| 5,436,022 | A | | 7/1995 | Chiang et al. |
| 5,871,574 | A | | 2/1999 | Kawaragi et al. |

FOREIGN PATENT DOCUMENTS

| JP | 54024940 | 2/1979 |
| JP | 359109135 | 2/1979 |

(Continued)

OTHER PUBLICATIONS

Carotenoid Composition in Raw and Cooked Spanish Vegetables NPL, 1992.*

(Continued)

*Primary Examiner*—Timothy M Speer
*Assistant Examiner*—Preston Smith
(74) *Attorney, Agent, or Firm*—Browdy and Neimark, PLLC

(57) ABSTRACT

A red colorant is formed of 500 to 3000 ppm of crystalline lycopene mainly encapsulated by chromoplasts, and having a soluble solid concentration below 5° Bx.

21 Claims, 1 Drawing Sheet

FOREIGN PATENT DOCUMENTS

| | | |
|---|---|---|
| JP | 52 18218 | 8/1993 |
| JP | 5218218 | 8/1993 |
| WO | 79 25093 | 2/1979 |
| WO | 92 18471 | 10/1982 |

OTHER PUBLICATIONS

Derwent Publications, JP54024940, (1979).

Khaschik et al., "Effects of Food Preparation on Qualitative and Quantitative Distribution of Major Carotenoid Constituents of Tomatoes and Several Green Vegetables", *Agricultural and Food Chemistry*, vol. 40, pp. 390-398, (1992).

Dale et al., "Concentration of Tomato Products: Analysis of Energy Saving Process Alternatives", *Journal of Food Science*, vol. 47, pp. 1853-1858, (1982).

Iwatsuki et al, "Isolation and Properties of Intact Chromplasts from Tomato Fruits", *Plant & Cell Physiology*, vol. 25, No. 5, pp. 763-768, (1984).

Tonucci et al., "Carotenoid Content of Thermally Processed Tomato-Based Food Products", *Agric. Food Chem.*, vol. 43, No. 3, pp. 579-586, (1995).

Gerster, "The Potential Role of Lycopene for Human Health", *Journal of the American College of Nutrition*, vol. 16, No. 2, pp. 109-126, (1997).

Clinton, "Lycopene: Chemistry, Biology, and Implications for Human Health and Disease", *Nutrition Reviews*, vol. 56, No. 2, pp. 35-50, (1998).

Goose et al., "Tomato Paste", Food Trade Press Ltd., United Kingdom.

W. M. Thomas et al; "An Evaluation of Blanch, Lye and Freeze-Heat Methods for Tomato Peel Removal"; Canadian Institute of Food Science and Technology; vol. 9, No. 3, Jul. 1976, pp. 118-124.

Rombauer et al; Joy of Cooking; Bobbs-Merrill Co., New York, 1975; pp. 331-335.

Barnhart, C.L., Ed.; The American College Dictionary; Random House, New York, 1970, p. 648.

A. E. Purcell et al; Journal of Agricultural and Food Chem., vol. 17, No. 1, 1969, pp. 41-42.

B. S. Luh et al; Commercial Vegetable Processing; Van Nostrand Reinhold; New York, 1988, pp. 298-305.

Giovannucci, "Tomatoes, Tomato-Based Products, Lycopene, and Cancer: Review of the Epidemiologic Literature", *Journal of National Cancer Institute*, vol. 91, No. 4, pp. 317-325, (1999).

Cheung et al., Maintenance of Chloroplast Components . . . Plant Physiol. 101, 1223-29, 1993.

Hirayama et al., Jap. Pat. Abs. 61-81761, Aug. 1986.

Yoshikura et al., Jap. Pat. Abs. 56/8459, Jan. 1981.

Mimura, N., Spoge Cake Making, Jap. Pat. No. 35-9109134, Jun. 1934.

Gould, W.A., "Tomato production, processing & technology" 3rd ed., CTI Publications Inc., Baltimore, M.D., Date: NA.

FDA Standards of Identity Part 155-Canned Vegetables, Date NA.

\* cited by examiner

NATURAL COLORING PRODUCTS

This is a continuation of application Ser. No. 09/449,093 filed Nov. 24, 1999, itself a continuation-in-part of application Ser. No. 09/392,866 filed Sep. 9, 1999, which is a continuation-in-part of application Ser. No. 08/507,632 filed Jul. 25, 1995.

FIELD OF THE INVENTION

The present invention relates to novel natural coloring products. More particularly, the invention relates to lycopene-based coloring materials.

BACKGROUND OF THE INVENTION

Coloring materials are used for a variety of applications, particularly in the food industry. Yellow-red colors are of great importance to the food industry and are used, e.g. to impart more "natural" colors to carbonated drinks, soups and a wide variety of food products. In recent years the food industry has experienced a shortage of yellow-red coloring materials, due to the fact that a number of synthetic food colors have been suspected of carcinogenic activity, and the use of some of these materials has been prohibited by health agencies.

The art has failed so far in providing versatile coloring materials in the yellow-red color range from natural sources, which are not suspected of being harmful to health. In some instances, β-carotene, extracted from natural sources e.g. algae, is used as a natural coloring material for the orange-yellow color range. However, known natural materials often suffer from various severe drawbacks. In general, their use is very expensive since their coloring potency is inferior to that of synthetic colorants. Furthermore, many natural colors are pH-dependant and thus change their color after incorporation within food products as a result of pH changes, or due to oxidation in air, and are often readily destroyed by moderate heat.

One candidate for use as a natural coloring material is lycopene, which like β-carotene, belongs to the family of the carotenoids. These pigments are found in higher plants, algae, bacteria and fungi, and are synthesized intracellularly within particulate organelles called chromoplasts. Lycopene has the formula:

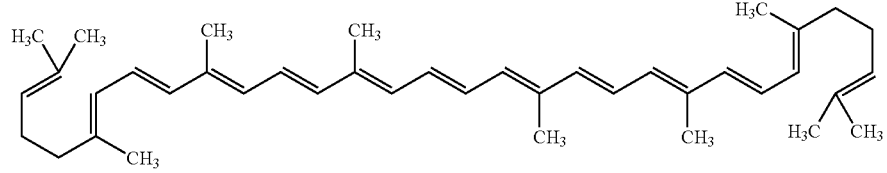

and can be found in many plant sources, including tomatoes and watermelon. Lycopene is the compound which imparts the bright red color to these fruits, but conventional methods of extraction destroy the crystalline structure of this pigment, thus altering its red color to orange-yellow, similar to the color obtainable with β-carotene.

In addition to its use as a coloring agent, lycopene is known to be an effective natural antioxidant and quencher of free radicals, especially those derived from oxygen. These properties are due to the unique chemical structure of lycopene, which is a long hydrocarbon chain consisting of eight isoprene units, containing 11 conjugated double bonds and 2 non-conjugated double bonds. In humans, reactive oxygen species, including free radicals, are formed as a natural part of the oxidation process, but in a healthy organism, these molecules are neutralized by a complex system of enzymes and antioxidants before they can incur damage to cells and tissues. However, excess of reactive oxygen species, expressed as oxidative stress, appears to play an important role in the initiation and promotion of cancers, atherosclerosis, arthritis and other degenerative diseases. At the same time, overwhelming evidence exists in the scientific literature that diets rich in vegetables and fruits are associated with lower risks of the development of these degenerative diseases. Moreover, the role of lycopene in conferring protection against such conditions, due to its antioxidant properties, is strongly suggested by numerous research efforts. Reviews which address this topic and contain extensive bibliography are: "Lycopene: Chemistry, Biology and Implications for Human Health and Disease", in Nutrition Reviews, Vol 56, No. 2, February 1998, pp. 35-51, by Steven K. Clinton; "The Potential Role Lycopene for Human Health", in Journal of the American College of Nutrition, Vol. 16, No. 2, 1997, pp. 109-126, by Helga Gerster, and "Tomatoes, Tomato-Based Products, Lycopene and Cancer: Review of the Epidemiologic Literature", in Journal of the National Cancer Institute, Vol. 91, No. 4, Feb. 17, 1999, by Edward Giovannucci.

Lycopene is a normal constituent of human plasma, and is found therein in concentrations greater that that of any other dietary carotenoid. In addition, its ability to neutralize reactive oxygen species is more effective than that of β-carotene or any other tested carotenoid. Since lycopene is not synthesized by the human body, it must be obtained from dietary sources, such as tomato. It thus becomes evident that a concentrated lycopene preparation could be useful not only as a natural coloring agent, but also as a health-promoting natural "nutraceutical". Nutraceuticals are an emerging class of dietary supplements, which are foods or parts of foods having specific health benefits, including the prevention or treatment of disease.

Processes are known in the art for extracting and concentrating carotenoids from natural sources and processed food products. Chromoplasts, the organelles containing carotenoids, may be isolated from tomato fruits on the basis of their characteristic density via a biochemical procedure involving Percoll density gradient centrifugation. Although this method has enabled study of the biochemical changes occurring during the ripening process, such a method is not suited to the food processing industry which demands large scale application and the absence of biochemical reagents which could compromise human health, and/or impart an undesirable taste to the final product. Similarly, carotenoid compounds have been isolated from various processed tomato-based food products via biochemical methods employing volatile solvents. Such analytical scale techniques have proven useful for quantifying carotenoid concentrations for the purpose of enlarging nutrient survey and food composition databases, but are not suitable for industrial scale production of an additive-free food coloring material.

U.S. Pat. No. 4,726,955 relates to a process for the preparation of pulverant carotenoid preparations for food coloring agents. The process utilizes organic solvents for dissolving the carotenoids, followed by their colloidal dispersion with milk products.

U.S. Pat. No. 5,245,095 relates to a solvent-free method of extracting carotenoids from natural sources, particularly carrots. The carotenoids are precipitated from a liquid fraction of the juiced source material using a calcium salt precipitating agent. This method is not suitable for the extraction of lycopene from tomatoes, since in that fruit, following breakage and separation into liquid (serum) and solid (pulp) fractions, practically all the lycopene is found in the pulp and only a minute quantity is found in the serum. Furthermore, growing consumer demand for safe and additive-free food coloring materials make both the above methods deficient, and unlikely to withstand scrutiny from public health interest groups.

Many processes are also known in the art for producing tomato pastes and concentrates, products which do indeed contain high concentrations of lycopene. However, these products also contain high concentrations of those tomato components which contribute aroma, viscosity and flavor to the final product. These latter properties are contributed by the soluble solids present in tomato. In the tomato, soluble solids constitute about 5% by weight of the whole fruit. (All percentages, as well as parts per million (ppm) in this specification and claims are by weight, unless otherwise specified). The insoluble solids, which include the lycopene-containing chromoplasts, constitute about 1% of the weight of the fruit, while the remaining 94% is contributed by water. In the production of tomato paste, only water is removed, thus increasing the concentrations of both the soluble and insoluble solids by the same ratio.

In the field of food technology, the soluble solids content of foods is frequently reported in degrees Brix, (° Bx) which is a measurement of the light refraction of the dissolved solids, expressed as sucrose. While a native whole tomato contains approximately 5° Bx of soluble solids, commercially available tomato pastes contain about 30° Bx. Similarly, while a native whole tomato typically contains approximately 70 ppm lycopene, commercially available tomato pastes contain approximately 350 to 400 ppm lycopene. Hence, while tomato paste is enriched about 6-fold in lycopene concentration, taking into consideration losses incurred upon processing, tomato paste is also enriched about 6-fold in the concentration of the components which contribute tomato flavor.

Thus, while prior art processes such as those disclosed in U.S. Pat. No. 3,864,504, U.S. Pat. No. 4,670,281 and U.S. Pat. No. 5,229,160 may be efficient for producing good quality tomato concentrates with high color value, none of the products of these inventions could be utilized solely as a food coloring agent. A food coloring agent should be versatile, and therefore devoid of the aroma and flavor of the source from which it was derived. Likewise, U.S. Pat. No. 4,181,743 relates to a method of processing plant products, including tomatoes, to produce flavoring extracts from their juices. Obviously, such a product could not be used as a coloring material, since it will impart both color and flavor to the food product to which it is added.

It is therefore clear that it would be highly desirable to provide a coloring material from natural sources, particularly tomatoes, which is capable of imparting a red color to food and other products, yet is largely devoid of other properties of the source from which it was derived, such as texture, aroma and flavor, and does not present the problems inherent to prior art colorants. It is an object of the present invention to provide such novel coloring materials, which can be safely employed as colorants in a variety of food products.

It is an object of the present invention to provide such novel coloring materials, such that the concentration of coloring material of the invention is at least 10-fold that of the native fruit source material from which it was derived, while at the same time, the concentration of soluble solids in the coloring material is no greater than the concentration of soluble solids in the native fruit source material from which it was derived, and optionally less than said concentration.

It is an object of the present invention to provide such novel coloring materials without the use of exogenous reagents, so that such coloring materials can be safely employed as colorants in food products.

It is another object of the invention to provide natural coloring materials which overcome the drawbacks of prior art materials, which present improved stability to pH changes and heat processing, and which can be used in a variety of food products.

It is still another object of the invention to provide a process for preparing such novel coloring materials.

It is a further object of the invention to provide food products to which a desired shade of red has been imparted by the coloring materials of the invention, while not imparting flavor of the source from which the coloring materials were derived.

A major advantage of the present invention is that it provides a concentrated form of a natural phytochemical which has health promoting properties. Hence, reference herein to the natural coloring materials of the present invention also refers to a food-derived preparation which is beneficial to human health and can be utilized as an agent for promoting and maintaining human health i.e. a nutraceutical.

Other objects and advantages of the invention will become apparent as the description proceeds.

SUMMARY OF THE INVENTION

Figure 1:
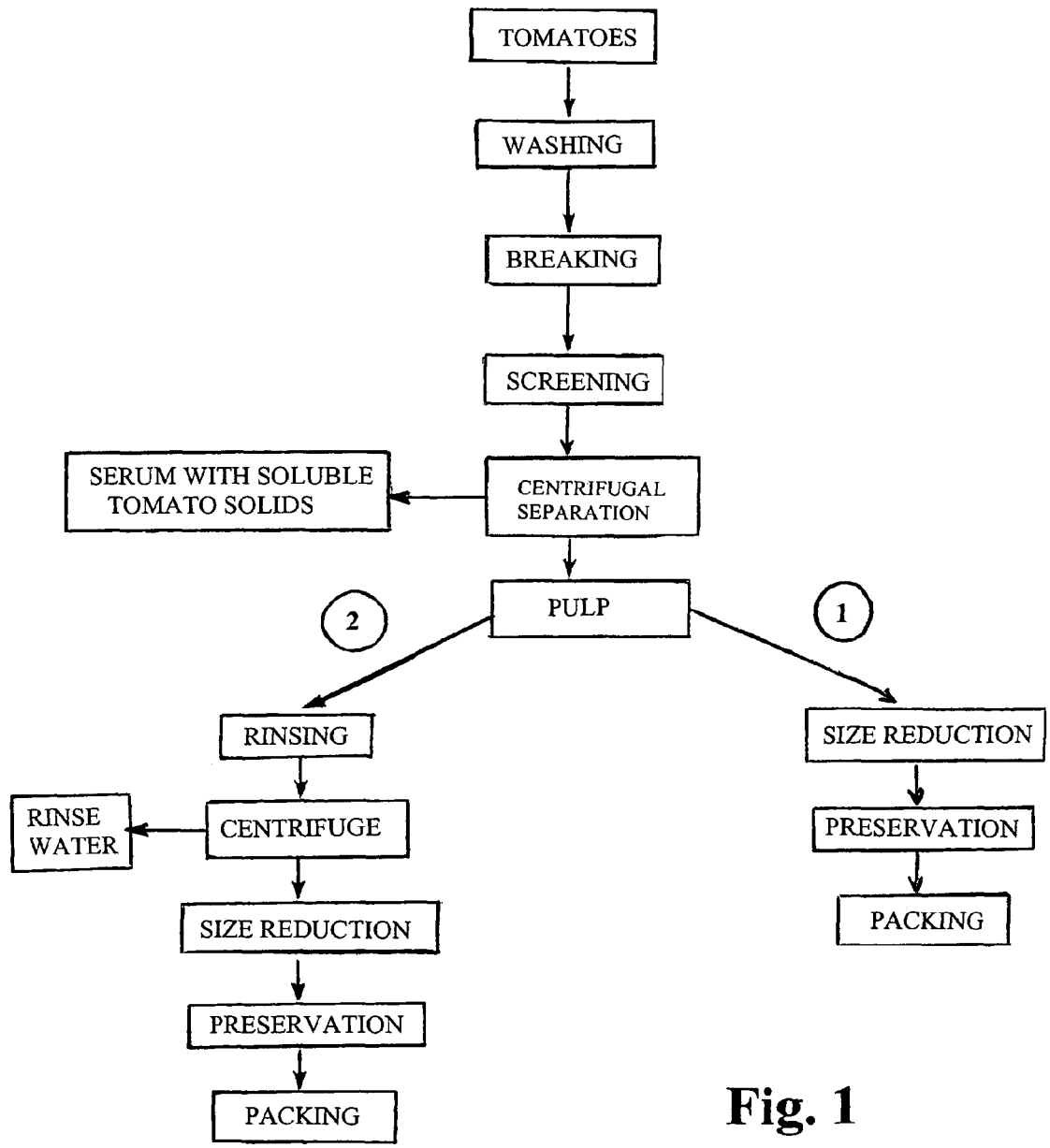
FIG. 1 is a schematic flow-sheet of two alternative preparation processes, leading to coloring material useful for different uses.

The coloring material of the invention comprises, as the color-imparting agent, intact and partially broken chromoplast particles containing crystalline lycopene, separated from the fruit which contained them, and from the bulk of the flavor-imparting components of the fruit. Said chromoplast particles containing crystalline lycopene also comprise a nutraceutical, natural lycopene being an effective antioxidant, useful for promoting and maintaining human health.

Naturally occurring chromoplasts present in fruits are small natural double-membrane capsules. Chromoplasts present in lycopene-rich fruit, such as tomato, contain lycopene in crystalline form, and in varying concentrations and crystal sizes. Upon breakage and fractionation of tomato fruit into soluble and insoluble fractions, the chromoplasts are found in the insoluble fraction in concentrated form. The intense red color of lycopene is absolutely dependent on its intact crystalline structure; hence it is likely that keeping the lycopene, associated with the chromoplasts, either intact or partially broken, is instrumental in maintaining the red color.

That is, the crystalline structure of lycopene is more readily preserved therein, and is not destroyed or otherwise changed, as occurs with rigorous extraction of the chromoplasts. Partial mechanical breakage of a fraction of the chromoplasts is permissible for the coloring materials of the invention described herein, as it does not significantly affect the coloring potential in the red range, as compared to the detrimental effect of organic extraction of pigments, which is effected according to the known art. Additionally, the chromoplast particles containing crystalline lycopene, separated from the fruit which contained them, have been found to be relatively insensitive to the effects of heat and oxidation, which strongly and adversely affect pure lycopene.

It is an aspect of the invention, therefore, to use as color-imparting agent lycopene, containing or comprising chromoplasts separated from the fruit which contained or comprised them. The expression "chromoplasts separated from the fruit which contained or comprised them", as used herein, signifies chromoplasts which are no longer a part of the natural structure of the fruit, and which, while they may be accompanied by and/or mixed with other fruit components, as hereinafter specified, are not accompanied by and/or mixed with the remaining part of the fruit components, such as stalks and peel.

A substantial advantage of the coloring material according to the invention is that it is easily water-dispersible. This, as will be appreciated by a skilled person, is an essential feature for a colorant meant for the food industry, since most food products are water based.

The use of the chromoplasts, according to the invention, may be accomplished by mixing the color material containing them with the food product, to which a red color is to be imparted or the color of which is to be improved. In liquid products, such as vegetable juices, the mixing is obviously easy, and can be further facilitated, if desired, by providing the coloring material in liquid form, e.g. as hereinafter explained. However, the coloring material can be added to non-liquid food products as any other additive, by the techniques used for the other additives, which techniques are well known and anyway obvious to skilled persons. For instance, the food product may be a cheese which must contain colored particles, e.g. to emphasize its content of vegetable components. In that case, the coloring material according to the invention is added to the cheese when this latter is in a soft pasty state; and is then mixed therewith in any suitable mixer. These operations are generally carried out at room temperature, but it is not ruled out that heating may be required to facilitate the mixing.

It should be noted that, while there is no specific teaching in the art for the use of lycopene extracts from tomatoes of the like fruit for coloring purposes, it is customary in the art to extract pigments from natural sources, for use as flavors or colorants, e.g. as is done with β-carotene or chlorophyll. However, nowhere in the art can be found a teaching that chromoplast particles containing a crystalline carotenoid, such as lycopene, can be directly used as a color imparting agent, without organic solvent extraction, nor that such material will retain a higher coloring power and deeper red shade. Further, there is no teaching in the art of a coloring material comprising said chromoplast particles as color-imparting agent.

The chromoplast which contains lycopene can be derived from a variety of fruits, and there is no limitation to its source. According to a preferred embodiment of the invention, however, the chromoplast particles containing crystalline lycopene are derived from tomatoes, and reference will be made mostly to tomatoes in the following description, as the representative source, it being understood that statements made in respect of tomatoes apply to other sources as well, mutatis mutandis. Furthermore, the use of the materials of the inventions as colorants is not limited to food products, and they can be used for any other suitable purposes.

Lycopene in the coloring material of the present invention is in the concentration range from 500 to 3000 ppm, which is at least 10-fold the concentration of lycopene found in whole native tomatoes, which is in the range from 50 to 100 ppm. The higher limit of the concentration range of the coloring material of the present invention may be achieved using as a starting material a tomato variety which is especially rich in lycopene. At the same time, the concentration of soluble solids in the coloring material of the present invention is no greater than 5° Bx, which is approximately the same concentration of soluble solids found in whole native tomatoes. That is, the red color potency of the coloring material of the present invention is approximately 10-fold that of whole native tomatoes, while the flavor value of the coloring material of the present invention is not at all concentrated.

The lycopene in its concentrated form in the present invention can be utilized for the purpose of a nutraceutical. Lycopene is known to be an antioxidant, an important factor for preventing oxidative stress in humans. Thus the high lycopene concentration of the present invention has powerful antioxidant capability, and is thus useful as an agent to maintain and promote human health. Foods and beverages which are colored with the lycopene concentrate of the present invention thus contain as a "bonus feature" the health promoting capability of this pigment.

In many cases, specifically when the food product to be colored is not related to the source of the coloring material, natural flavors found therein render it unsuitable for use, For instance, when coloring a sweet fruit dessert, even a small level of tomato flavor is highly undesirable. According to a preferred embodiment of the invention, therefore, the coloring material is water-rinsed to remove flavors, prior to such use. Since the color imparting agents of the invention are solid water-insoluble materials, rinsing removes only the water soluble flavor components (sugars, acids, etc.), while the color value remains constant. Additionally, no solvents or other chemicals are employed in the process of the invention, and therefore no foreign and/or potentially harmful materials are used at any time during the manufacturing of the coloring concentrate of the invention.

Another advantage of the invention is that it is possible to provide different degrees of coloring power in the coloring materials of the invention, by producing them starting with different pigment content in the fruits. Growing high-pigment containing tomatoes, for instance, is within the skill of the routineer, and different varieties, containing different concentrations of lycopene, can be developed by means known per se, which are not discussed here. Thus, instead of the regular tomatoes, which contain approximately 50 to 100 ppm of lycopene, tomatoes with, e.g. 200 ppm of lycopene or higher can be developed. Furthermore, genetic engineering techniques make it possible to create tomato varieties having increased lycopene content. As will be apparent to the skilled person, it is particularly convenient to be able to concentrate a high coloring power in small amounts of coloring material, which is achieved by the invention by concentrating the chromoplasts containing a high content of lycopene. Thus, according to one embodiment of the invention, the coloring material of the invention is obtained from a high lycopene-content tomato variety.

The coloring material of the invention comprises, as has been said, the lycopene containing chromoplasts. It further comprises color-neutral substances. By "color-neutral materials" is meant herein materials that have no color-imparting properties. Said color-neutral substances comprise insoluble, solid particles derived from the fruit tissues, such as fibers and peel particles, and optionally seeds, having linear dimensions below a maximum dimension that is preferably comprised between 8 mm, and more preferably 3 mm, and 0.8 mm. Further, the coloring material contains water, preferably in an amount from 2% (if dehydrated) to 85%. The water may have minor amounts of soluble color-neutral substances dissolved therein.

The coloring material can be provided for use in different forms. In one preferred embodiment of the invention, it is provided in dehydrated form. In another preferred embodiment of the invention, it is provided in frozen form, or preserved by other means, e.g., by pasteurization. It can also be mixed with or dispersed in water to provide a liquid product.

The invention is also directed to a process for preparing a coloring material comprising as the color-imparting agent chromoplast particles containing crystalline lycopene, which process comprises the steps of:
 a) selecting and pretreating lycopene-containing fruit, in particular tomatoes, by cleaning it, e.g. by washing or the like procedure;
 b) breaking the fruit;
 c) screening out solid components above a predetermined dimension; and
 d) separating by centrifugation, the fruit serum from the material thus obtained, whereby to obtain a color concentrate comprising the insoluble color-imparting agent, viz. The lycopene-containing chromoplasts, together with water insoluble color-neutral materials The aforesaid predetermined dimension, above which the solid components are separated, is determined by the size of the opening of the screening means used for the screening operation, and is preferably in the range between 8 mm, and more preferably 3 mm and 0.8 mm. Stalks and large peel fragments of the fruit are removed in operation c) in any case. If the openings of the screening means are sufficiently small e.g. 1 mm or less, the seeds are removed in the screening out operation. Otherwise, they remain in the color concentrate, together with other solid, insoluble particles having similar dimensions. The serum, removed by centrifugation, in operation d), contains most, e.g. about 90%, of the water, and water soluble solids present in the material after screening.

When the fruit is tomato, operations a) to c) are not essentially different from those conventionally carried out in the tomato processing industry. They are described in the literature of this art, e.g. in Commercial Vegetable Processing, by Bor Shiun Luh and J. G. Woodruff, Van Nostrand Reinhold, New York (1988), and Tomato Production, Processing and Technology, by W. A. Gould, CTI Publications Inc., Baltimore, (1992).

The color concentrate constituting the coloring material of the invention, obtained as hereinbefore described, may be used as such, or may be processed in various ways, as hereinafter described, to provide said coloring material.

DETAILED DESCRIPTION OF PREFERRED EMBODIMENTS

According to a preferred embodiment of the invention, the color concentrate is further processed by water-washing it to remove water-soluble flavors.

Another preferred embodiment of the invention, the color concentrate is further processed by size-reducing the insoluble color-imparting agent comprised in it, to better utilize the staining power of the material through the more uniform dispersion thereof in the final product, thus obtaining a better and more uniformly colored product.

If the resulting material is to be stored for a relatively long period of time, it is desired to process it to avoid degradation thereof by microbial spoilage. This can be effected in many ways known in the art, e.g., by aseptic packaging, freezing, canning or dehydrating, alone or with the addition of suitable food preservatives.

The process is schematically shown in FIG. 1, two alternative routes being shown by way of example, such processes being provided for the purpose of illustration only, which example is not to be construed as a limitation of the invention. At the beginning, the fruits, e.g. the tomatoes are washed, broken and screened to remove coarse insoluble portions, such as stalks, skin and other waste matter and optionally seeds. About 90% of the insoluble portions, for example, may be removed in this way. After this operation, a material remains which comprises a serum, which is a solution of soluble tomato solids, and a color concentrate, comprising the chromoplasts, water and color-neutral materials, which have not been separated by the screening. The serum, which is a by-product in this process, is separated by centrifugation. The remaining color concentrate can be processed according to either of the two schemes shown.

Route 1, provides for size reduction of particles in the color concentrate e.g., in a colloid mill or microcutter, and the resulting fine material, which constitutes the coloring material in this embodiment of the invention, is sent to a packaging stage, to be discussed below.

Route 2 includes the removal of water-soluble flavor materials. The color concentrate is washed with water, and the resulting wet material is centrifuged, size-reduced, e.g., in a colloid mill or microcutter, and the resulting fine material, which constitutes the coloring material in this embodiment of the invention, is preserved and packed.

It will be apparent, and it is emphasized, that the expression "color concentrate", as used in this specification and claims, designates the material obtained from the tomato by separating from it the coarse solid particles, and the serum that is a solution of soluble tomato solids. Said color concentrate comprises the chromoplasts, water and color-neutral substances.

It will also be apparent, and it is emphasized, that the expression "coloring material", as used in this specification and claims, means the aforesaid color concentrate either as such or after it has undergone any required processing, in particular, but not exclusively, size-reduction, packaging, and any operations required or useful for preserving and/or storing it and/or avoiding its degradation particularly by microbial spoilage, or facilitating its mixture with the food product which it is intended to color.

It will also be apparent, and it is emphasized, that the active component of the coloring material according to the invention, viz. the component that imparts to it its coloring properties, is constituted by the lycopene comprising chromoplasts, any other substances comprised therein being color-neutral.

Packaging the coloring material involves processing to avoid deterioration and to impart a suitable shelf life to it. This can be achieved in many ways known in the art, which are therefore not discussed here in detail. For instance, the material can be sterilized, frozen, dried, dehydrated, or can be packed or canned. Suitable food preservatives can also be used.

Also encompassed by the invention is a food product containing a coloring material according to the invention.

A particularly important embodiment of the invention is concerned with the coloring of tomato products. As will be apparent to the skilled person, the color of the tomatoes available to plants which produce, e.g., ketchup or tomato concentrates, varies according to the type of tomato, the time of the year, the degree of ripening, etc. However, it is a requirement of the food industries that the color of the final product be kept constant, so that the same ketchup color is supplied by the same manufacturer. Since it is forbidden to add synthetic coloring materials to such tomato products, and they must contain only materials which originate from tomatoes, standardization of the product color is often impossible, and the color fluctuates over a wide range.

According to an embodiment of the invention this problem is solved by using the coloring material hereinbefore defined, comprising, as color-imparting agent chromoplast particles containing crystalline lycopene. Thus, the invention is also directed to a method for producing tomato products of satisfactory and uniform color, which process comprises adding to the product obtained from the processing of tomatoes an amount of a coloring material according to the invention, sufficient to obtain the desired color. As will be understood by persons skilled in the art, different shades of red can be obtained in a given product, which can be defined by colorimetric measurements. These colorimetric methods, as well as apparatus for carrying them out, are well known in the art and, therefore, are not discussed herein in detail, for the sake of brevity. However, it is understood that the exact shade of red desired can be determined in each case, and can be obtained by the addition of the coloring materials of the invention.

The following, non-limitative examples, further illustrate the invention.

Example 1

Preparation of a Color-Imparting Agent

Tomatoes containing 120 ppm (by weight) of lycopene were pre-washed, and then broken and screened in a conventional apparatus known as a "pulper". The pulper was provided with a screen having openings of 0.8 mm. The mass thus obtained was subjected to centrifugal separation. The centrifugation separated the serum from the color concentrate. The color concentrate was subjected to size-reduction, in a colloid mill provided with cooling, or, alternatively, in a microcutter, e.g. as manufactured by Urschel, to yield a final color concentrate wherein the chromoplasts contain 1000 ppm of lycopene.

200 Ml of tap water were placed in a beaker, and 20 gr of the color concentrate obtained above were added, and the mixture was passed through a colloid mill to produce a stable dispersion similar to tomato juice in color, appearance and consistency, constituting the coloring material. Said material had a very slight tomato flavor, imparted by the substances dissolved in the water of the concentrate and its stability was similar to that of tomato juice.

Example 2

Preparation of a Color-Imparting Agent

Example 1 was repeated, with the exception that the color concentrate was rinsed once with an equal volume of water and centrifuged, to reduce the water content to 75-85%, before undergoing size reduction. The soluble substances imparting tomato flavor are removed practically completely together with the centrifuged water. After dispersion in water, a coloring material consisting of a stable red liquid was obtained, practically free from tomato flavor.

Example 3

Preparation of a Color-Imparting Agent

The same tomatoes used in Example 1 were pre-washed, and then broken and screened in a pulper similar to that used in Example 1, but provided with a screen having openings of 5 mm. The mass thus obtained was subjected to centrifugal separation as in Example 1. The color concentrate thus obtained contained the chromoplasts, the seeds, and fibers and skin particles small enough to have passed through the screen. The color concentrate was subjected to size-reduction, as in Example 1, to yield a color concentrate which contains 1500 ppm of lycopene, and was subsequently rinsed and centrifuged, as in Example 2, to remove all tomato flavor.

Example 4

Use of the Coloring Material

A coloring material, consisting in the concentrate obtained in Example 1, was added, instead of to tap water, to a tomato concentrate, the color of which was unsatisfactorily light. The concentrate was added in an amount of 8% of the tomato concentrate, and thoroughly mixed with it by means of a mixer. The addition of the coloring material of the invention significantly improved the color of the product and shifted it towards red color to a satisfactory degree.

Example 5

Use of the Coloring Material

The coloring material obtained in Example 3 was added to a spaghetti sauce, the color of which was unsatisfactorily light. The concentrate was added in an amount of 10% of the tomato concentrate, and thoroughly mixed as in Example 4. The addition of the coloring material of the invention significantly improved the color of the product and shifted it towards red color to a satisfactory degree.

Example 6

Use of the Coloring Material

A coloring material, consisting of the color concentrate obtained in Example 3, but not subjected to size reduction, was added to pizza sauce, the color of which was unsatisfactorily light. The concentrate was added in an amount of 9% of the pizza sauce, and thoroughly mixed as in Example 4. The addition of the coloring material of the invention significantly improved the color of the product and shifted it towards red color to a satisfactory degree.

Example 7

Use of the Coloring Material

The coloring material obtained in Example 2 was mixed with a vegetable juice mix, in a proportion of 8% of concentrate to 92% of juice mix. The addition of the coloring material of the invention imparted to the juice mix a red color.

Example 8

Use of the Coloring Material

The coloring material obtained in Example 2 was added a spiced white cheese mix, in a proportion of 8% of concentrate to 92% of cheese mix, and the resulting pasty material was mixed, but not thoroughly, so that red color particles were distributed within the white cheese mass. The addition of said color particles imparted to the cheese mix a pleasing appearance, suggesting the presence of added vegetable matter.

All the above description has been given for the purpose of illustration and is not intended to limit the invention in any way. Many variations can be effected in the various processes, treated products and sources of material, without exceeding the scope of the invention.

The invention claimed is:

1. A process for preparing a coloring material comprising, as a color-imparting agent, chromoplast particles containing crystalline lycopene, the process comprising:
   a) selecting and pre-treating a lycopene-containing fruit by cleaning it;
   b) breaking the fruit;
   c) screening out solid components above a predetermined dimension;
   d) separating by centrifugation a fruit serum from a solid material thus obtained
   thereby obtaining a color concentrate comprising said color-imparting agent; and
   e) subjecting the color concentrate to size reduction thereby obtaining a coloring material, wherein the coloring material has a lycopene concentration from 500 to 3000 ppm and a soluble solids concentration below 5° Bx.

2. A process according to claim 1, wherein the fruit comprises tomatoes.

3. A process according to claim 2, further comprising water-washing the color concentrate to reduce tomato flavor.

4. A process according to claim 1, further comprising processing the color concentrate to avoid microbial spoilage.

5. A process according to claim 3, comprising at least one preservation technique selected from the group consisting of aseptic packaging, freezing, canning and dehydrating, optionally with the addition of a food preservative.

6. The process according to claim 1 further comprising dehydrating the coloring material to obtain concentrated coloring material.

7. A tomato product colored with a coloring material produced according to claim 6.

8. A process for coloring a food product, the process comprising:
   a) cleaning and breaking tomatoes which comprise chromoplasts containing crystalline lycopene in an amount of at least 120 ppm;
   b) screening out solid components therefrom of a predetermined size;
   c) separating a serum from a screened tomato solid material by centrifugation;
   d) subjecting the tomato solid material to size reduction thereby obtaining a color concentrate comprising said crystalline lycopene in a concentration from 500 to 3000 ppm, and
   e) introducing a coloring-effective amount of said concentrate into said food product, said amount being insufficient to impart a tomato flavor in said food product.

9. A process according to claim 8 wherein unless said products are not tomato products, further comprising washing the color concentrate.

10. A process according to claim 8 which comprises subjecting the color concentrate to size reduction.

11. A process according to claim 10, wherein the size reduction is carried out by processing the color concentrate in a colloid mill or microcutter.

12. A process according to claim 8 further comprising processing the color concentrate prior to using it as a coloring material by subjecting it to one or more of the following preservation techniques: aseptic packaging, canning, freezing or dehydrating.

13. The process according to claim 1 wherein the step of subjecting the color concentrate to size reduction is by using a colloid mill or a microcutter.

14. A method for producing a tomato product of constant color, comprising adding to the tomato product a coloring effective amount of a coloring material produced according to claim 6.

15. A coloring material prepared according to the process of claim 1.

16. The coloring material according to claim 15 further comprising color-neutral substances.

17. The coloring material according to claim 15 prepared from tomatoes.

18. The coloring material according to claim 17 wherein the tomatoes comprise a high lycopene-content tomato variety.

19. A coloring material prepared according to claim 3, wherein the coloring material imparts substantially no tomato flavor.

20. A concentrated coloring material prepared according to the process of claim 7.

21. A lycopene additive comprising the coloring material according to claim 15.

* * * * *